(12) United States Patent
Peter et al.

(10) Patent No.: US 6,996,963 B2
(45) Date of Patent: Feb. 14, 2006

(54) UTILITY CART FOR USE ON A LAWNMOWER

(75) Inventors: Timothy J. Peter, Appleton, WI (US); Fredric D. Schreiner, DePere, WI (US); Robert T. Woelfel, Hilbert, WI (US)

(73) Assignee: Ariens Company, Brillion, WI (US)

( * ) Notice: Subject to any disclaimer, the term of this patent is extended or adjusted under 35 U.S.C. 154(b) by 0 days.

(21) Appl. No.: 10/721,569

(22) Filed: Nov. 25, 2003

(65) Prior Publication Data

US 2005/0109002 A1 May 26, 2005

(51) Int. Cl.
*A01D 43/00* (2006.01)
(52) U.S. Cl. ............................................. 56/202
(58) Field of Classification Search ................ 56/199, 56/202, 205, 206, 203, DIG. 9; 280/47.26
See application file for complete search history.

(56) References Cited

U.S. PATENT DOCUMENTS

| | | | | |
|---|---|---|---|---|
| 421,370 | A | * 2/1890 | Kelley | ............................. 56/199 |
| 1,182,365 | A | 5/1916 | Goldberg et al. | |
| 1,686,934 | A | * 10/1928 | Serva | ............................. 403/156 |
| 2,250,846 | A | * 7/1941 | Sullivan | ............................. 56/199 |
| 2,525,090 | A | 10/1950 | Bott | |
| 2,654,106 | A | * 10/1953 | Parker | ............................. 15/79.1 |
| 2,727,264 | A | * 12/1955 | Dunham | ............................. 15/79.1 |
| 2,801,862 | A | * 8/1957 | Parker et al. | ............................. 280/47.26 |
| 2,959,904 | A | * 11/1960 | Ferris | ............................. 56/344 |
| 2,965,910 | A | * 12/1960 | Ranst | ............................. 15/79.1 |
| 3,065,588 | A | 11/1962 | Shaw | |
| 3,119,136 | A | 1/1964 | Newsom | |
| 3,134,118 | A | 5/1964 | Chouinard | |
| 3,636,686 | A | * 1/1972 | Meyer et al. | ............................. 56/320.2 |
| 3,678,665 | A | 7/1972 | Stanke | |
| 3,694,855 | A | * 10/1972 | Meyer et al. | ............................. 16/437 |
| 3,726,069 | A | 4/1973 | Cope | |
| 3,805,500 | A | 4/1974 | Sweet | |
| 3,908,221 | A | 9/1975 | Wolfe | |
| 4,043,102 | A | 8/1977 | Uhlinger et al. | |
| 4,084,284 | A | 4/1978 | Hastings | |
| 4,262,475 | A | * 4/1981 | Takahashi et al. | ............................. 56/16.6 |

(Continued)

FOREIGN PATENT DOCUMENTS

EP 009774 A1 * 9/1979

(Continued)

OTHER PUBLICATIONS

Ariens Company brochure: Start a Family Tradition; published prior to Sep. 12, 2002 (4 pages).

*Primary Examiner*—Thomas B. Will
*Assistant Examiner*—Alicia Torres
(74) *Attorney, Agent, or Firm*—Michael Best & Friedrich LLP

(57) ABSTRACT

A utility cart for lawn and garden applications and adapted for mounting on a lawnmower for catching vegetation clippings from the lawnmower. The cart includes at least one wheel that is in a stowed position when the cart is mounted on a lawnmower such that the at least one wheel bears no weight of the cart. The cart has substantially rigid walls and a handle movable between stowed and deployed positions. The handle pivots with respect to the cart by way of pins in a pivot slot and a guide slot. The slots include locking portions that receive the pins and prevent the handle from pivoting with respect to the cart to facilitate hauling items in the cart and to facilitate lifting the cart off of a lawnmower.

9 Claims, 6 Drawing Sheets

U.S. PATENT DOCUMENTS

| | | |
|---|---|---|
| 4,345,418 A | 8/1982 | Arizpe |
| 4,478,031 A | 10/1984 | Wolf |
| 4,598,536 A | 7/1986 | Langley |
| 5,983,613 A * | 11/1999 | Winter ........................ 56/13.3 |
| 6,050,576 A * | 4/2000 | Tanner et al. ............. 280/47.21 |
| 6,735,930 B2 | 5/2004 | Sugiyama et al. |

FOREIGN PATENT DOCUMENTS

| | | |
|---|---|---|
| JP | 5219815 | 8/1993 |

* cited by examiner

UTILITY CART FOR USE ON A LAWNMOWER

BACKGROUND

The invention relates to a cart that is adapted for use as a lawnmower bagger and also as a utility cart for lawn and garden applications independent of a lawnmower.

SUMMARY

The invention provides a cart adapted to be removably mounted to a lawnmower and collect vegetation clippings from a lawnmower, and also adapted for use as a utility cart for lawn and garden applications. The cart includes a body defined by a plurality of substantially rigid walls. The walls at least partially define a collection space within the cart. A collecting opening communicates with the collection space and is aligned with a discharge opening in the lawnmower such that vegetation clippings flow from the lawnmower into the collection space.

The cart also includes at least one wheel rotatable with respect to the rest of the cart. The wheel is in a stowed position in which it supports substantially no weight of the cart when the cart is mounted to the lawnmower. The at least one wheel at least partially supports the cart upon the detachment of the cart from the lawnmower to facilitate hauling away clippings in the cart.

The cart is also usable as a utility cart in lawn and garden applications without a lawnmower. For example, the cart can be used to haul dirt, mulch, flowers, sod, and the like around a yard. The rigid sides of the cart keep the top of the cart open to make it easier to shovel or toss items or materials into the cart. When pulling the cart by the handle, the front opening of the cart tips upwardly to retain the contents of the cart in the collection space.

Other features and advantages of the invention will become apparent to those skilled in the art upon review of the following detailed description, claims, and drawings.

Figure 1:
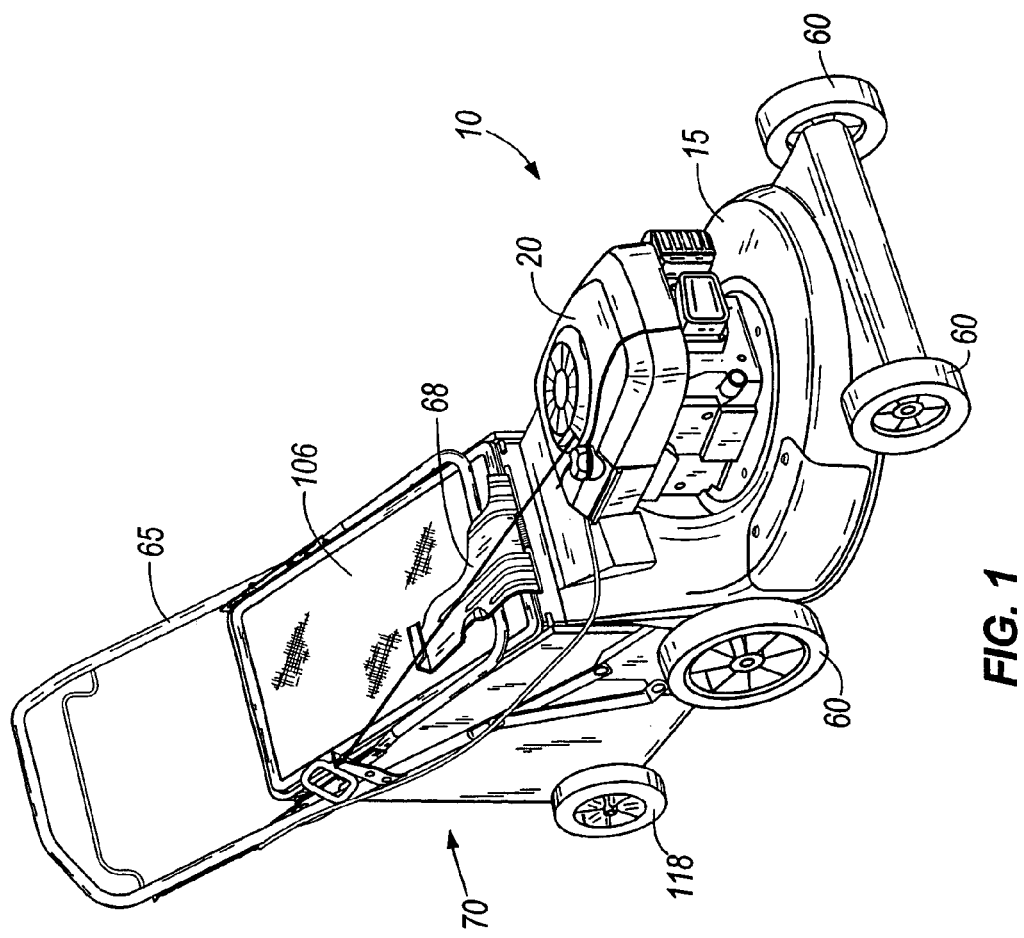
FIG. 1 is a perspective view of a lawnmower and cart assembly with a portion of the assembly being cut away for illustrative purposes.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION

Figure 2:
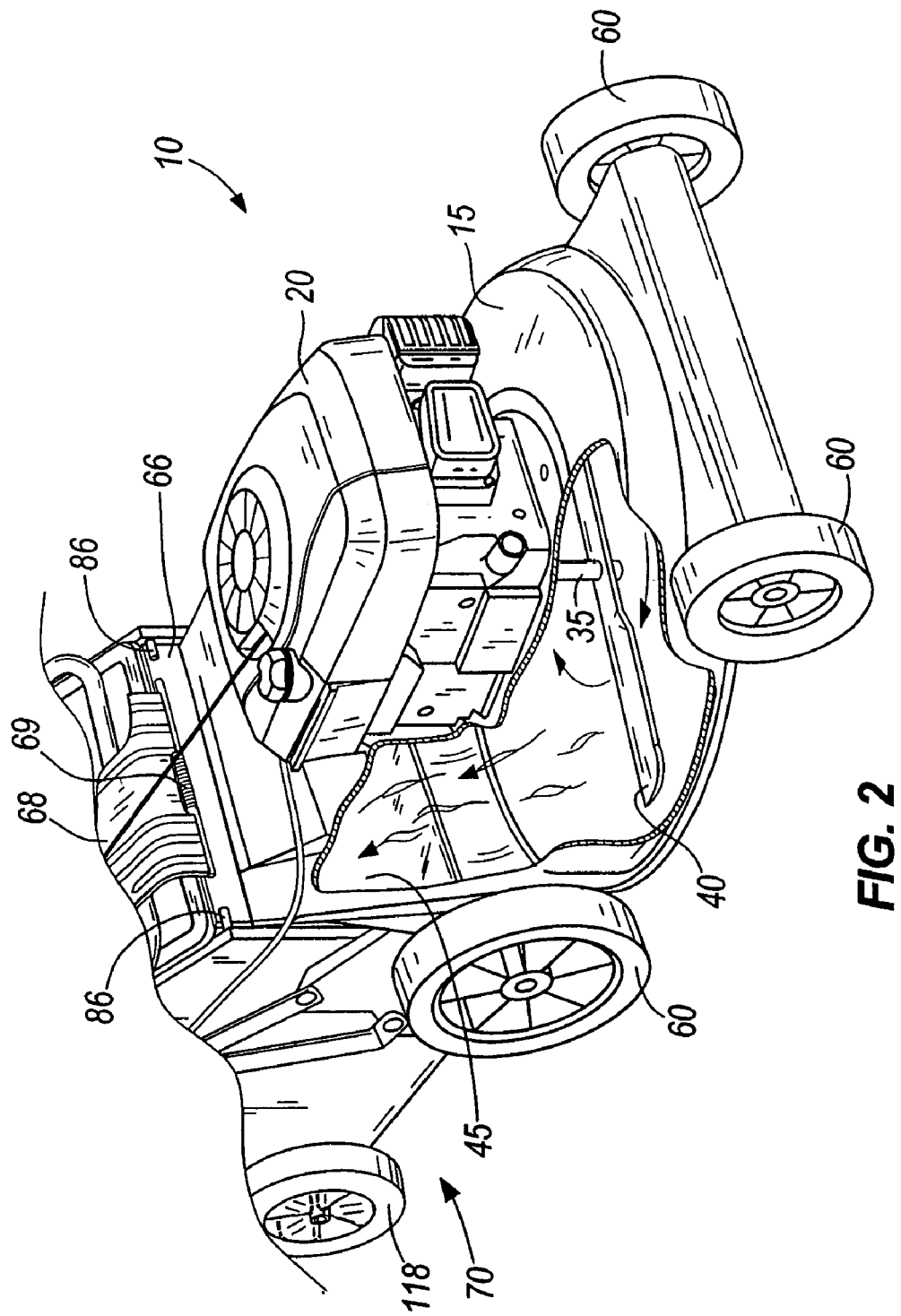
FIG. 2 is a partially cut-away perspective view of a portion of the assembly.

FIGS. 1 and 2 illustrate a lawnmower 10 which includes a deck 15 that supports an engine 20. The engine 20 has an output shaft 35 that extends through the deck 15 and into the cutting space under the deck 15. The output shaft 35 is rotatable in response to operation of the engine 20. A cutting blade 40 is mounted to the output shaft 35 and is rotatable therewith to cut grass and other vegetation under the deck 15. The cutting blade 40 also creates a whirlwind in the cutting space under the deck 15 to cause clippings to swirl around under the deck 15. In other embodiments there may be multiple blades on separate shafts under the deck 15. In such alternative embodiments, the separate shafts are coupled (e.g., with belts or chains) to the output shaft 35 of the engine 20 and rotate in response to rotation of the output shaft 35.

The deck 15 includes in its rear side a discharge opening 45 through which clippings are permitted to escape from under the deck 15. A plurality of mower wheels 60 support the mower deck 15 and a mower handle 65 is interconnected to and extends up from the deck 15. The mower handle 65 is manipulated by a lawnmower operator to move the lawnmower 10 on the mower wheels 60. In this regard, the mower wheels 60 and mower handle 65 facilitate movement of the lawnmower 10.

A plate 66 is mounted to the rear of the deck 15. The plate 66 may be considered part of the deck 15, even though it is a separate part, because the plate is permanently affixed to the deck (e.g., by welding). Alternatively, the plate 66 may be an integral part of the deck 15 or may be a separate part that is mounted with fasteners to the deck 15. A door 68 is pivotally mounted to the top of the plate 66 and is biased with a torsion spring 69 to close the discharge opening 45 unless the door 68 is propped open. A cart 70 is releasably attached to the plate 66 and props the door 68 open, as will be explained in more detail below.

Figure 3:
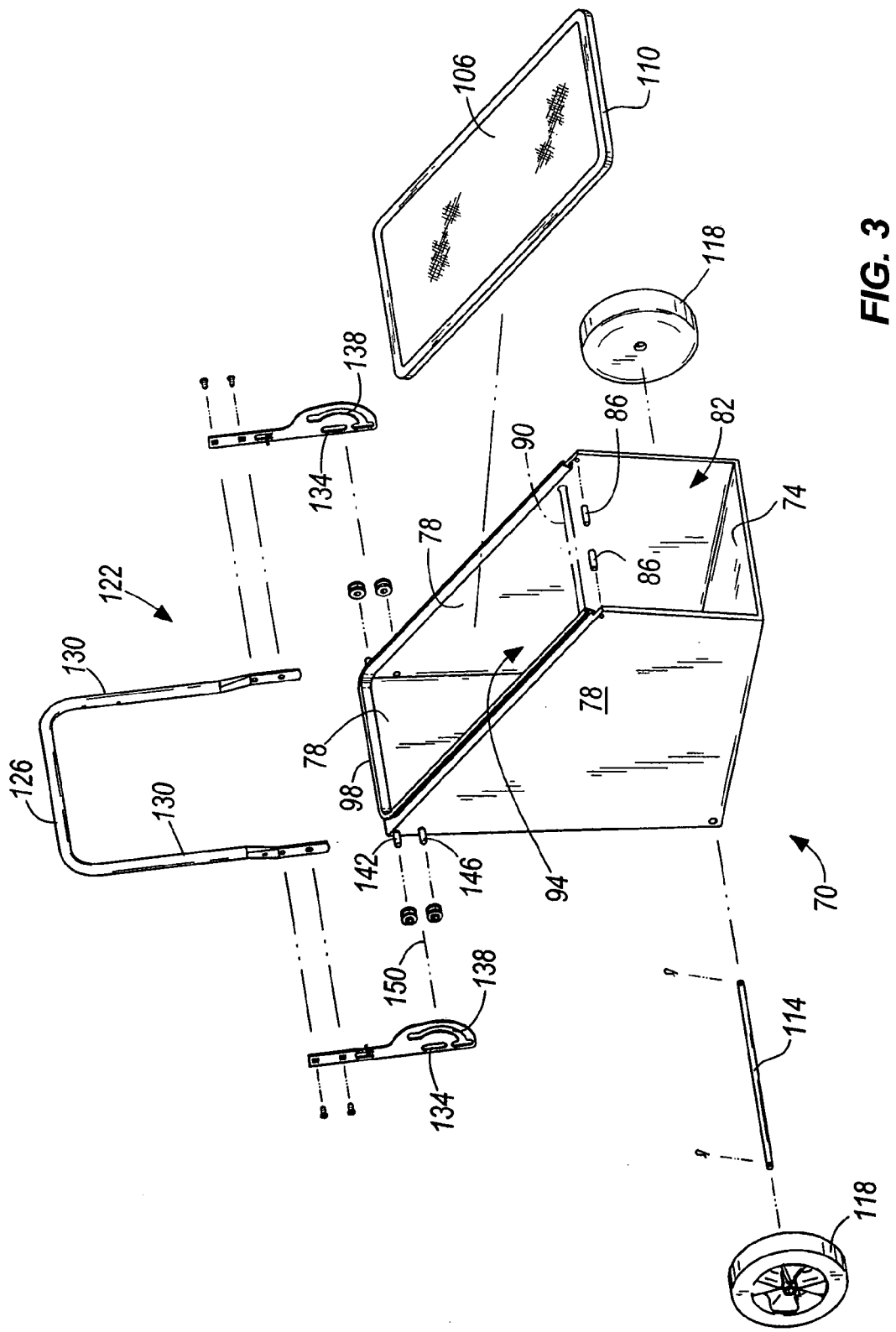
FIG. 3 is an exploded view of the cart and handle assembly.

With reference to FIG. 3, the cart 70 has a body that includes a base 74 having four edges, and three walls 78 extending upwardly from three of the edges. The invention is not limited to the illustrated four-sided cart 70, and the present invention contemplates carts of substantially any shape. The base 74 and walls 78 are constructed of substantially rigid material such as aluminum or steel sheet material. A front cart opening 82 is defined between the fourth edge of the base 74 and the edges of two of the walls 78. Mounting pins 86 extend inwardly into the cart opening 82 from the top corners of the side walls 78. If necessary, a brace 90 (shown in phantom) can be employed between the top edges of the side walls 78 of the cart 70 to keep the sides of the cart from bowing apart. A top cart opening 94 is defined by the upper edges of the walls 78 of the cart 70. A ridge 98 runs along the upper edges of the walls 78.

Figure 4:
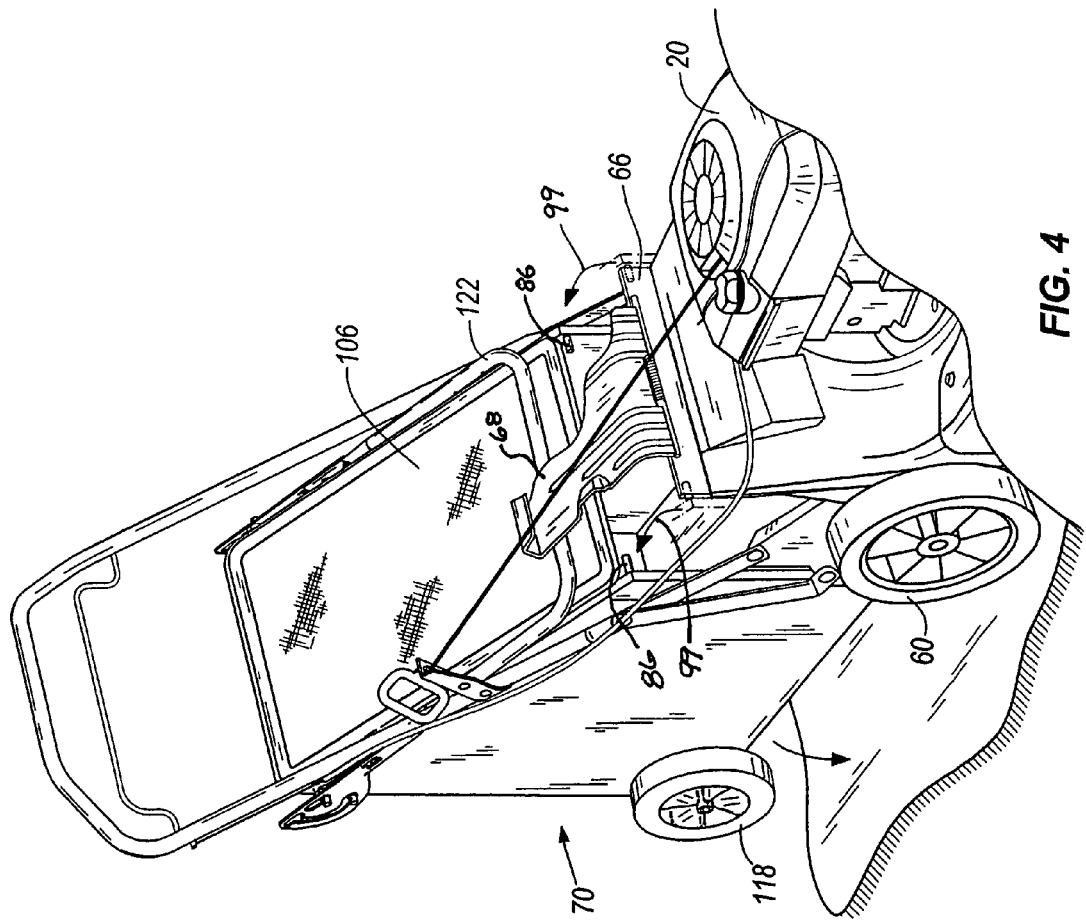
FIG. 4 is a perspective view of the lawnmower with arrows indicating how the cart is detached therefrom.

As seen in FIG. 4, the cart 70 is releasably mounted on the lawnmower 10 by way of the pins 86 being positioned behind the corners of the plate 66. The cart 70 must be moved vertically and then rearwardly (as indicated with arrows 99) when detaching the cart 70 with respect to the lawnmower 10. The door 68 must be pivoted open to provide clearance for the pins 86 to be positioned behind the plate 66. Because the door 68 is biased toward the closed position, the door 68 presses down on the top of the cart 70 and assists in keeping the cart 70 mounted to the plate 66. The weight of the cart 70 and its contents also biases the cart 70 to pivot about the pins 86 into engagement with the back of the lawnmower deck 15. When the cart 70 is mounted to the lawnmower 10, the front opening 82 is aligned with the discharge opening 45 in the deck 15. Grass and other vegetation clippings flow out from under the deck 15, through the discharge opening 45 and front opening 82, and into a collection space defined between the base 74 and walls 78 of the cart body.

With reference again to FIG. 3, a screen or cover 106 is releasably attached to the ridge 98 on top of the cart 70, and helps retain the contents of the cart 70 within the collection space, especially during lawnmower operation when air and debris are being blown out of the discharge opening 45 and into the collection space. The screen 106 is preferably perforated to permit the flow of air out of the collection space but retain substantially all of the contents of the cart 70 within the collection space. The screen 106 may therefore be constructed of a metallic mesh or of a material similar to those that are used in known lawnmower grass collectors or baggers.

The screen 106 includes a depending portion 110 around its periphery. The depending portion 110 is preferably made of a resilient material (e.g., plastic or rubber) or is made of other materials (e.g., aluminum or steel) but is sufficiently thin to permit the depending portion 110 to deflect or bow. In either case, the depending portion 110 may be termed a "resilient depending portion." The depending portion 110 and the ridge 98 include mating lips that permit the screen 106 to be snapped onto and off of the cart 70 without the use of tools. More specifically, as the screen 106 is pressed onto or pulled off of the cart 70, the depending portion 110 deflects as the lips of the depending portion 110 ride out around the lips on the ridge 98. Once the lips of the depending portion 110 have cleared the lips on the ridge 98, the depending portion resiliently snaps back into its original shape. Alternatively, the depending portion may include an elastic band that engages the ridge 98 and does not include lips.

The cart 70 includes a single axle 114 extending across the base 74 or, alternatively, a pair of axles 114 mounted to the base 74. Wheels 118 are mounted to the axle or axles 114 and rotate with respect to the body to facilitate hauling grass or vegetation clippings in the cart 70. When the cart 70 is mounted to the lawnmower 10, the wheels 118 are in a stowed position (see FIG. 4) in which the wheels 118 support substantially no weight of the cart 70.

Figure 6:
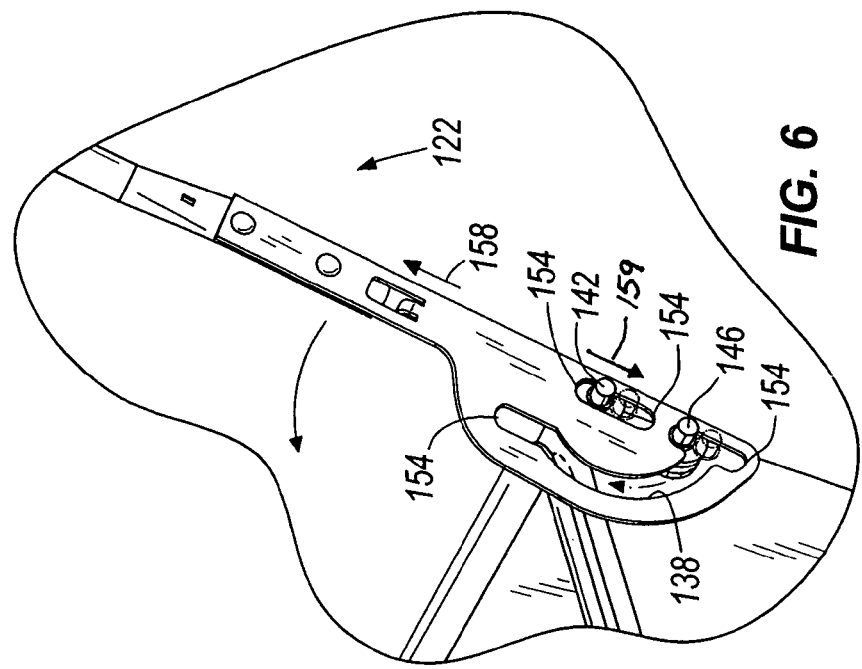
FIG. 6 is an enlarged view of the connection between the handle and the cart with the handle in the deployed position.
Figure 5:
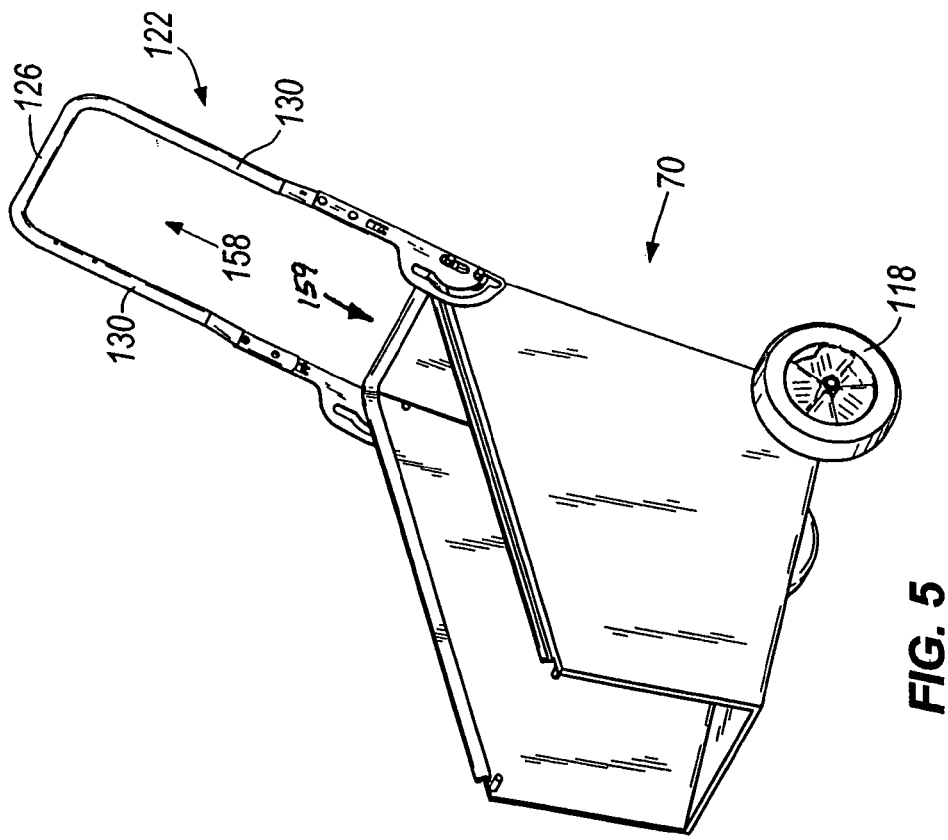
FIG. 5 is a perspective view of the cart with the handle in a deployed position.
Figure 8:
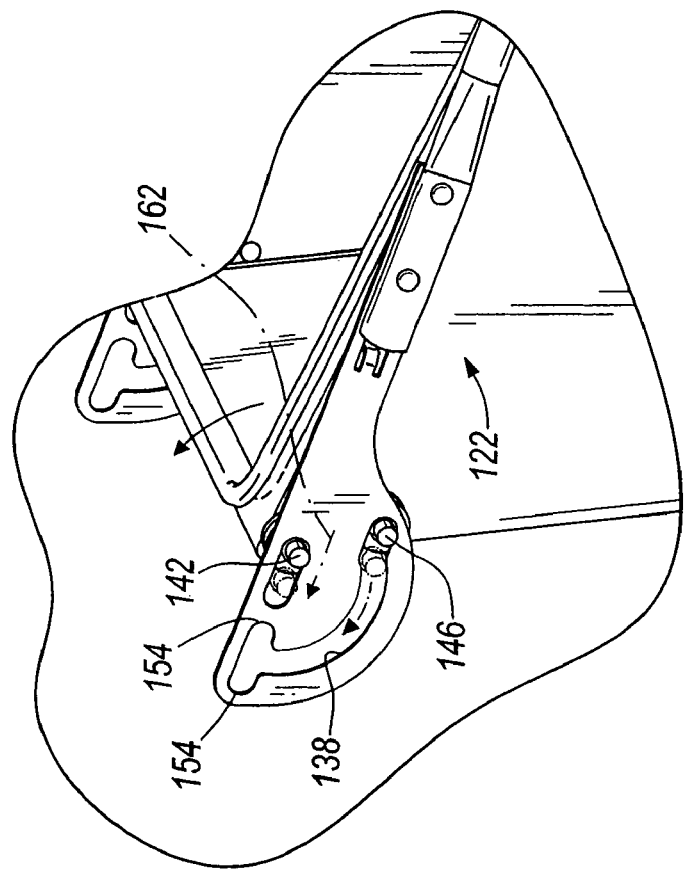
FIG. 8 is an enlarged view of the connection between the handle and the cart with the handle in the stowed position.
Figure 7:
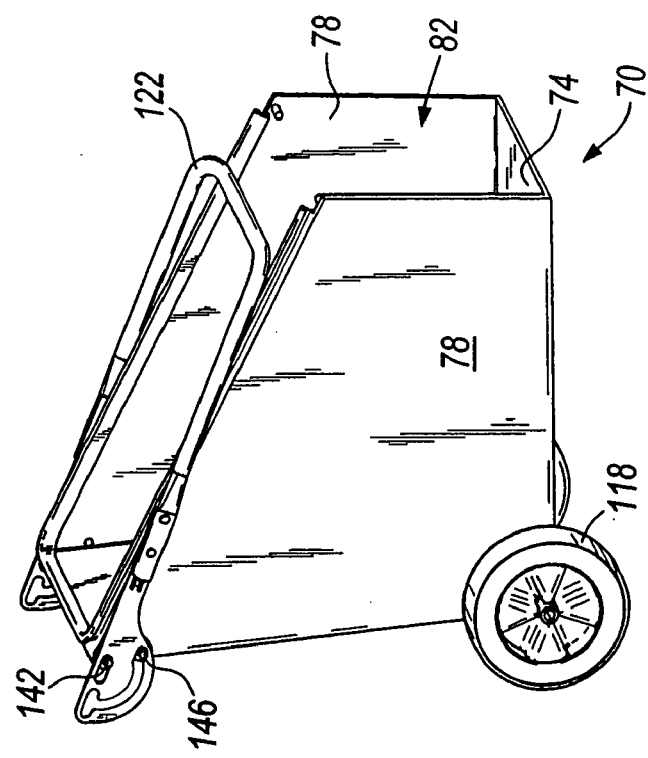
FIG. 7 is a perspective view of the cart with the handle in a stowed position.

A handle 122 is pivotally mounted to the cart 70 and is movable between a deployed position (as illustrated in FIGS. 5 and 6) and a stowed position (as illustrated in FIGS. 7 and 8). The handle 122 includes a cross member 126 and first and second arms 130. The arms 130 are interconnected to or integral with the cross member 126 at one end and are pivotally attached to the cart 70 at the opposite, free ends. More specifically, the free ends of the arms 130 each have a pivot aperture or slot 134 and an arcuate guide slot 138.

Figure 9:
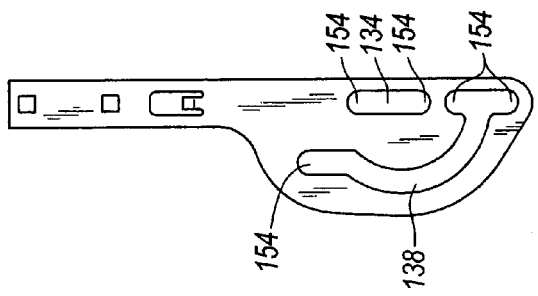
FIG. 9 is an enlarged side view of the slots in the handle.

The cart 70 includes a pivot pin 142 and a guide pin 146 on the outer surface of the side walls 78. The pivot pins 142 define a pivot axis 150 (FIG. 3) for the handle 122. The pivot pins 142 are received within the pivot apertures 134 and the guide pins 146 are received within the guide slots 138. The free ends of the arms 130 pivot about the pivot pins 142 as the handle 122 is pivoted. The guide slots 138 follow an arcuate path defined by the pivotal movement of the arms 130, and the guide pins 146 follow the guide slot 138 as the handle 122 is pivoted. It should be noted that the pins and slots may be reversed such that the arms 130 include the pivot pins 142 and guide pins 146 and the pivot aperture 134 and guide slot 138 are defined in the side walls 78 of the cart 70. The pivot pins 142 generally remain substantially in the center of the pivot apertures 134 when the handle 122 is pivoted. The pivot apertures 134 and the guide slots 138 also include locking portions 154 (FIG. 9) into which the pivot pins 142 and guide pins 146 may be moved to releasably lock the handle 122 in the deployed and stowed positions.

With reference to FIGS. 5 and 6, when the handle 122 is pivoted into the deployed position, the guide pins 146 are at the end of the arcuate guide slot 138 and are aligned with one of the locking portions 154. The pivot pins 142 are always aligned with their locking portions 154 because the pivot aperture 134 is merely a straight slot, but the pivot pins 142 cannot move into the locking portions 154 unless the guide pins 146 are also aligned with one of the locking portions 154 of the guide slot 138. When the handle 122 is moved in the direction indicated with arrow 158 (e.g., when the cart 70 is being pulled by its handle 122) or with arrow 159 (e.g., when pushing the cart 70), the pivot pins 142 and guide pins 146 are received into the respective locking portions 154 of the pivot aperture 134 and guide slot 138. Once in the locking portions 154, the pins 142, 146 will resist pivotal movement of the handle 122 and will transfer to the cart 70 any moment force (either clockwise or counterclockwise about an axis substantially parallel to the handle pivot axis 150) applied to the handle 122. In this regard, the handle 122 may be used to tip the cart 70 forward or backward to wheel the cart 70 around or to dump out its contents.

With reference to FIGS. 7 and 8, when the handle 122 is pivoted into the stowed position, the guide pin 146 is at the end of the arcuate guide slot 138 and is aligned with the other locking portion 154. When the handle 122 is moved in the direction indicated with arrow 162 (e.g., when the cart 70 is lifted by pulling up on the handle 122), the pivot pins 142 and guide pins 146 are received into the respective locking portions 154 of the pivot apertures 134 and guide slots 138. Once in the locking portions 154, the pins 142, 146 will permit the cart 70 to be lifted by the handle 122 and resist pivoting of the handle 122 with respect to the cart 70. The handle 122 (when locked in the stowed position) therefore facilitates lifting the cart 70 out of engagement with the lawnmower 70.

It should be noted that additional features, such as latches may be used to retain the pivot pins 142 and guide pins 146 in the locking portions 154 of the pivot apertures 134 and guide slots 138, and that the illustrated construction is not intended to be limiting. Other means for locking the handle 122 may also be employed in place of the locking portions 154 of the pivot apertures 134 and guide slots 138. For example, a clamp or latch can be mounted on the side of the cart 70 and attached to the cross member 126 or the arms 130 when the handle 122 is in the stowed position to lock the handle down.

The cart 70 is usable as a utility cart in lawn and garden applications without a lawnmower 10. For example, the cart 70 can be used to haul dirt, mulch, flowers, sod, and the like around a yard. The rigid base and sides 74, 78 of the cart 70 keep the top of the cart open to make it easier to shovel or toss items or materials into the cart 70. When pulling the cart 70 by the handle 122, the front opening 82 of the cart 70 tips upwardly to retain the contents of the cart 70 in the collection space.

What is claimed is:

1. A lawn and garden implement comprising:

a lawnmower having a deck, a mower handle extending upwardly from said deck to facilitate manipulating said lawnmower, an engine supported by said deck, a cutting blade under said deck and rotating under the influence of said engine, a discharge opening in said deck through which vegetation clippings cut by said cutting blade may escape from under said deck;

a collecting apparatus for collecting said clippings, said collecting apparatus including a plurality of substantially rigid walls at least partially defining a collection space, a collecting opening communicating with said collection space, and at least one wheel rotatable with respect to the rest of said collecting apparatus;

a handle coupled to the collecting apparatus and pivotable with respect to the collecting apparatus between a first position and a second position, said handle including means responsive to movement of the handle to the first position for inhibiting pivotal movement of the handle from said first position with respect to the collecting apparatus when said handle is in said first position, and means responsive to movement of the handle to the second position for inhibiting pivotal movement of the handle from said second position with respect to the collecting apparatus when said handle is in said second position; and means for releasably mounting said collecting apparatus to said lawnmower such that said discharge opening is substantially aligned with said collecting opening to cause clippings to flow into said collection space, and such that said at least one wheel is in a stowed condition and supports substantially no weight of said collecting apparatus when said collecting apparatus is mounted to said lawnmower;

wherein said at least one wheel at least partially supports said collecting apparatus upon the detachment of said collecting apparatus from said lawnmower to facilitate hauling away clippings in said collecting apparatus;

wherein said first position is a mowing position and said second position is a hauling position, said handle being in said mowing position when said collecting apparatus is mounted to said lawnmower and in said hauling position when hauling clippings in said collecting apparatus;

wherein said handle includes first and second arms and a cross member between first ends of said arms, wherein second ends of said arms are pivotally interconnected with said collecting apparatus;

wherein said collecting apparatus includes first and second pivot pins fixed with respect to said substantially rigid walls and defining a pivot axis for said handle, wherein said second ends of said first and second arms each have pivot apertures into which said first and second pivot pins are respectively received to interconnect said handle to said collecting apparatus such that said handle is pivotable about said pivot axis; and wherein at least one of said means for inhibiting includes at least one guide pin fixed with respect to at least one of said substantially rigid walls, and at least one arcuate guide slot in at least one of said first and second arms into which said first and second guide pins are respectively received; and wherein said guide slots describe an arc followed by said second ends of said first and second arms when said handle is pivoted with respect to said collecting apparatus such that said guide pins remain in said guide slots during handle pivoting.

2. The implement of claim 1, wherein said handle is pivotable about a pivot axis between said first and second positions, and wherein at least one of said means for inhibiting pivotal movement includes means for releasably locking said handle to permit said collecting apparatus to be tipped about an axis generally parallel to said handle pivot axis by a moment force applied to said handle.

3. The implement of claim 1, further comprising means for releasably locking said handle in said mowing position, wherein said means for releasably mounting said collecting apparatus to said lawnmower requires that said collecting apparatus be lifted to remove said collecting apparatus from said lawnmower, and wherein said collecting apparatus is liftable with respect to said lawnmower by way of said handle when said handle is locked in said mowing position.

4. The implement of claim 1, wherein said lawnmower includes a door pivotally attached to said deck and a biasing member biasing said door to a position covering said discharge opening; wherein said door must be opened to permit said collecting apparatus to be attached to said lawnmower, wherein said door engages a top surface of said collecting apparatus when said collecting apparatus is attached to said lawnmower; and wherein said biasing member biases said collecting apparatus to remain mounted on said lawnmower when said door engages said top surface of said collecting apparatus.

5. The implement of claim 1, wherein said collecting apparatus has an open top and further includes a removable screen over said open top to resist the escape of clippings from said collection space during operation of said lawnmower and hauling of clippings in said collecting apparatus, said screen being removable from the rest of said collecting apparatus without the use of tools to facilitate dumping the clippings out of said collection space.

6. A lawn and garden implement comprising:

a lawnmower having a deck, a mower handle extending upwardly from said deck to facilitate manipulating said lawnmower, an engine supported by said deck, a cutting blade under said deck and rotating under the influence of said engine, a discharge opening in said deck through which vegetation clippings cut by said cutting blade may escape from under said deck;

a collecting apparatus for collecting said clippings, said collecting apparatus including a plurality of substantially rigid walls at least partially defining a collection space, a collecting opening communicating with said collection space, and at least one wheel rotatable with respect to the rest of said collecting apparatus; and means for releasably mounting said collecting apparatus to said lawnmower such that said discharge opening is substantially aligned with said collecting opening to cause clippings to flow into said collection space, and such that said at least one wheel is in a stowed condition and supports substantially no weight of said collecting apparatus when said collecting apparatus is mounted to said lawnmower; wherein said at least one wheel at least partially supports said collecting apparatus upon the detachment of said collecting apparatus from said lawnmower to facilitate hauling away clippings in said collecting apparatus, further comprising a handle attached to said collecting apparatus and movable between a mowing position and a hauling position, said handle being in said mowing position when said collecting apparatus is mounted to said lawnmower and in said hauling position when hauling clippings in said collecting apparatus; wherein said handle includes first and second arms and a cross member between first ends of said arms, wherein second ends of said arms are pivotally interconnected with said collecting apparatus, and wherein said handle is pivotable between said mowing and hauling positions; wherein said collecting apparatus includes first and second pivot pins fixed with respect to said substantially rigid walls and defining a pivot axis for said handle, wherein said second ends of said first and second arms each have pivot apertures into which said first and second pivot pins are respectively received to interconnect said handle to said collecting apparatus such that said handle is pivotable about said pivot axis; wherein said collecting apparatus includes first and second guide pins fixed with respect to said substantially rigid walls; wherein said second ends of said first and second arms each have arcuate guide slots into which said first and second guide pins are respectively received; and wherein said guide slots describe an arc followed by said second ends of said first and second arms when said handle is pivoted with respect to said collecting apparatus such that said guide pins remain in said guide slots during handle pivoting; and wherein each of said pivot apertures and guide slots include hauling portions, wherein said handle is substantially prevented from pivoting with respect to said collecting apparatus when said pivot pins and guide pins are received within said hauling portions of said pivot apertures and guide slots such that said collecting apparatus may be tipped clockwise and counterclockwise about an axis generally parallel to said handle pivot axis by moment forces applied to said handle.

7. The implement of claim 6, wherein said pivot pins and guide pins are moved into said hauling portions of said pivot apertures and guide slots by linearly moving said handle with respect to said collecting apparatus once said handle is in said hauling position.

8. A lawn and garden implement comprising:
a lawnmower having a deck, a mower handle extending upwardly from said deck to facilitate manipulating said lawnmower, an engine supported by said deck, a cutting blade under said deck and rotating under the influence of said engine, a discharge opening in said deck through which vegetation clippings cut by said cutting blade may escape from under said deck;
a collecting apparatus for collecting said clippings, said collecting apparatus including a plurality of substantially rigid walls at least partially defining a collection space, a collecting opening communicating with said collection space, and at least one wheel rotatable with respect to the rest of said collecting apparatus; and
means for releasably mounting said collecting apparatus to said lawnmower such that said discharge opening is substantially aligned with said collecting opening to cause clippings to flow into said collection space, and such that said at least one wheel is in a stowed condition and supports substantially no weight of said collecting apparatus when said collecting apparatus is mounted to said lawnmower; wherein said at least one wheel at least partially supports said collecting apparatus upon the detachment of said collecting apparatus from said lawnmower to facilitate hauling away clippings in said collecting apparatus, further comprising a handle attached to said collecting apparatus and movable between a mowing position and a hauling position, said handle being in said mowing position when said collecting apparatus is mounted to said lawnmower and in said hauling position when hauling clippings in said collecting apparatus; wherein said handle includes first and second arms and a cross member between first ends of said arms, wherein second ends of said arms are pivotally interconnected with said collecting apparatus, and wherein said handle is pivotable between said mowing and hauling positions; wherein said collecting apparatus includes first and second pivot pins fixed with respect to said substantially rigid walls and defining a pivot axis for said handle, wherein said second ends of said first and second arms each have pivot apertures into which said first and second pivot pins are respectively received to interconnect said handle to said collecting apparatus such that said handle is pivotable about said pivot axis; wherein said collecting apparatus includes first and second guide pins fixed with respect to said substantially rigid walls; wherein said second ends of said first and second arms each have arcuate guide slots into which said first and second guide pins are respectively received; and wherein said guide slots describe an arc followed by said second ends of said first and second arms when said handle is pivoted with respect to said collecting apparatus such that said guide pins remain in said guide slots during handle pivoting; and wherein each of said pivot apertures and guide slots include lifting portions, wherein said pivot pins and guide pins are movable into said lifting portions of said pivot aperture and guide slots when said handle is in said mowing position, and wherein said handle is substantially prevented from pivoting with respect to said collecting apparatus when said pivot pins and guide pins are received within said lifting portions such that said collecting apparatus may be lifted out of engagement with said lawnmower by grasping and lifting said handle.

9. A cart adapted to be removably mounted to a lawnmower and collect vegetation clippings from a lawnmower, and also adapted for use as a utility cart for lawn and garden applications, the cart comprising:
a body defined by a plurality of substantially rigid walls, said walls at least partially defining a collection space;
a collecting opening through which vegetation clippings flow from the lawnmower into said collection space when said cart is mounted to the lawnmower;
a handle movable between a stowed position and a deployed position, said a handle including a locking portion operable to inhibit pivotal movement of said handle from said stowed position when said handle is in said stowed position, and from said deployed position when said handle is in said deployed position;
first and second mounting pins above said collecting opening, said mounting pins being adapted to be received within slots on the lawnmower such that said cart hangs down from said pins with said collecting opening aligned with a discharge opening of the lawnmower; and
at least one wheel rotatable with respect to the rest of said cart, said wheel being in a stowed position in which it supports substantially no weight of said cart when said cart is mounted to the lawnmower;
wherein said at least one wheel at least partially supports said cart upon the detachment of said cart from the lawnmower to facilitate hauling away clippings in said cart, and wherein said handle is in said stowed position when said cart is mounted to the lawnmower and in said deployed position when hauling clippings in said cart.

* * * * *